3,088,869
ANTIEMETIC COMPOSITIONS AND METHODS OF TREATING NAUSEA AND VOMITING
Charles L. Zirkle, Berwyn, Pa., assignor to Smith Kline & French Laboratories, Philadelphia, Pa., a corporation of Pennsylvania
No Drawing. Filed Aug. 29, 1961, Ser. No. 134,585
8 Claims. (Cl. 167—55)

This invention relates to pharmaceutical compositions having antiemetic activity and to methods of treating nausea and vomiting.

The compositions of this invention are particularly useful by virtue of their specificity of action in producing antiemetic effects. In contrast to the potent phenothiazine class of antiemetics, these compositions are devoid of complicating side effects. In dosage amounts usually employed for antimetic activity, the compositions of this invention have little or no behavioral, tranquilizing, depressant, potentiating or antihistaminic effects.

More specifically the pharmaceutical compositions of this invention comprise in dosage unit form a nontoxic pharmaceutical carrier and 1,1-diphenyl-4-(1-piperidyl)-butanol-1 which has the following formula:

Formula I

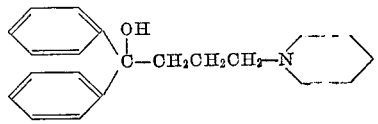

The nontoxic pharmaceutically acceptable acid addition salts of the compound of the above formula are also included within the scope of this invention since such salts are likewise effective for use as antiemetics. Both organic and inorganic acids can be employed to form pharmaceutically acceptable salts, illustrative acids being sulfuric, nitric, phosphoric, citric, acetic, lactic, tartaric, ethanedisulfonic, sulfamic, succinic, fumaric, maleic, hydrochloric, hydrobromic, benzoic and the like. These salts are prepared by methods known to the art.

The antiemetic activity of the compound of Formula I is readily shown by animal experimentation. Thus administration of this compound to dogs known to be sensitive to the emetic effect of apomorphine reduces the emetic response.

The pharmaceutical compositions of this invention comprise 1,1-diphenyl-4-(1-piperidyl)-butanol-1 in an amount sufficient to produce antiemesis. Preferably the compositions contain from about 10 mg. to about 100 mg. of medicament, advantageously from about 20 mg. to about 50 mg. per dosage unit.

The pharmacetutical carrier employed in the composition can be either a solid or liquid. Exemplary of solid carriers are lactose, magnesium stearate, terra alba, sucrose, talc, stearic acid, gelatin, agar pectin or acacia. Exemplary of liquid carriers are peanut oil, olive oil, sesame oil and water. Similarly the carrier or diluent may include a time delay material such as glyceryl monostearate or glyceryl distearate alone or with a wax.

A wide variety of pharmaceutical forms can be employed and are prepared by methods well known to the art. Thus if a solid carrier is used the composition can be tableted, used as a pharmaceutical powder, placed in a hard gelatin capsule or in the form of a troche or lozenge. If a liquid carrier is used the composition can be in the form of a soft gelatin capsule or a liquid suspension. Parenteral dosage forms are obtained by dissolving a water-soluble salt of the active medicament in water or saline solution in a concentration such that 1 cc. of the solution contains from about 10 mg. to about 25 mg. of active medicament. The solution can then be filled into single or multiple dose ampules.

The method in accordance with this invention comprises administering internally to animals, including human beings, 1,1-diphenyl-4-(1-piperidyl)-butanol-1 or a nontoxic organic or inorganic acid addition salt thereof, preferably with a nontoxic pharmaceutical carrier such as described above, in an amount sufficient to control nausea and vomiting of varied etiology. The active medicament in dosage units as described above is administered orally or parenterally in repeated doses until a satisfactory response is obtained. The daily dosage is from about 10 mg. to about 300 mg. of active medicament, advantageously from about 20 mg. to about 200 mg. When the method described above is carried out, nausea and vomiting is controlled rapidly and effectively.

In veterinary practice, the compositions can be given per se or as an additive to the animal feed or drinking water.

The compound of Formula I above which forms the active medicament in the pharmaceutical compositions and is useful in the method of this invention is prepared by the following general procedure. Piperidine is alkylated with 1-bromo-3-chloropropane and the resulting 1-(3-chloropropyl)-piperidine, converted to the corresponding Grignard reagent, is reacted with benzophenone to give the 1,1-diphenyl-4-(1-piperidyl)-butanol-1 free base.

The following examples are not limiting but set forth the preparation of the compound of Formula I above in detail and illustrate specific pharmaceutical compositions of this invention.

*Example 1*

A solution of 2.21 kgm. of piperidine, 2.63 kgm. of triethylamine and 7 l. of benzene is heated to 50° C. with stirring. Then, without external heating, 4120 gm. of 1-bromo-3-chloropropane are added during two and one-half hours. When the addition is complete, refluxing continues spontaneously for two hours. Eternal heat is then applied to maintain the reflux for an additional 30 minutes. The mixture is cooled to 10° C. and the precipitated triethylamine hydrobromide is removed by filtration and washed well with benzene. The filtrate is concentrated in vacuo and the residue is distilled to give 1-(3-chloropropyl)-piperidine, B.P. 120–165° C./30 mm.

A mixture of 144 gm. of magnesium and 1 l. of tetrahydrofuran is heated to 60° C. and 1068 gm. of 1-(3-chloropropyl)-piperidine in 3 l. of tetrahydrofuran is added. When the addition is complete (about three hours), 728 gm. of benzophenone in 1 l. of tetrahydrofuran is added over 90 minutes while a steady reflux is maintained. Refluxing is continued for another hour while 1500 ml. of tetrahydrofuran is distilled off. The remaining tetrahydrofuran is removed under vacuum and the resulting dark viscous mixture is poured with stirring into 5 l. of ice water and 800 gm. of ammonium chloride. This mixture is cooled for 12 hours and the crystalline base is separated. After recrystallization from isopanol the base, 1,1-diphenyl-4-(1-piperidyl)-butanol-1, melts at 103–104° C.

A portion of the base is converted to the hydrochloride salt in isopropanol solution by the addition of 10% isopropanolic hydrogen chloride. The recrystallized hydrochloride melts at 208–211° C.

*Example 2*

Various strength capsules are prepared containing 1,1-diphenyl-4-(1-piperidyl)-butanol-1 either as the free base or an equivalent amount of a nontoxic pharmaceutically acceptable acid addition salt thereof from the following ingredients:

| Medicament, mg. | Magnesium Stearate, mg. | Lactose, mg. |
|---|---|---|
| 20 | 2 | 250 |
| 30 | 2 | 210 |
| 50 | 3 | 150 |

The above ingredients are screened through a #40 U.S. mesh screen, mixed and filled into hard gelatin capsules.

What is claimed is:

1. A pharmaceutical composition having antiemetic activity, in dosage unit form, comprising a pharmaceutical carrier and from about 10 mg. to about 100 mg. of a compound selected from the group consisting of 1,1-diphenyl-4-(1-piperidyl)-butanol-1 and a nontoxic pharmaceutically acceptable acid addition salt thereof.

2. A pharmaceutical composition having antiemetic activity, in dosage unit form, comprising a pharmaceutical carrier and from about 20 mg. to about 50 mg. of a compound selected from the group consisting of 1,1-diphenyl-4-(1-piperidyl)-butanol-1 and a nontoxic pharmaceutically acceptable acid addition salt thereof.

3. A method of controlling nausea and vomiting which comprises internally administering from about 10 mg. to about 100 mg. of an antiemetic selected from the group consisting of 1,1-diphenyl-4-(1-piperidyl)-butanol-1 and a nontoxic pharmaceutically acceptable acid addition salt thereof.

4. The method in accordance with claim 3 in which 1,1-diphenyl-4-(1-piperidyl)-butanol-1 is administered.

5. The method in accordance with claim 3 in which 1,1-diphenyl-4-(1-piperidyl)-butanol-1 hydrochloride is administered.

6. The method in accordance with claim 3 in which the administration is orally to human beings.

7. A method of controlling nausea and vomiting which comprises internally administering a daily dosage of from about 10 mg. to about 300 mg. of an antiemetic selected from the group consisting of 1,1-diphenyl-4-(1-piperidyl)-butanol-1 and a nontoxic pharmaceutically acceptable acid addition salt thereof.

8. A method of controlling neusea and vomiting which comprises internally administering a daily dosage of from about 20 mg. to about 200 mg. of an antiemetic selected from the group consisting of 1,1-diphenyl-4-(1-piperidyl)-butanol-1 and a nontoxic pharmaceutically acceptable acid addition salt thereof.

References Cited in the file of this patent

FOREIGN PATENTS

| 683,950 | Great Britain | Dec. 10, 1952 |
| 772,516 | Great Britain | Apr. 17, 1957 |